United States Patent
Park et al.

(10) Patent No.: US 10,229,088 B2
(45) Date of Patent: Mar. 12, 2019

(54) APPLICATION PROCESSOR AND SYSTEM ON CHIP

(71) Applicant: SAMSUNG ELECTRONICS CO., LTD., Suwon-si (KR)

(72) Inventors: Jong Lae Park, Anyang-si (KR); Sang Ho Lim, Seoul (KR); Hwang Sub Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 29 days.

(21) Appl. No.: 15/134,882

(22) Filed: Apr. 21, 2016

(65) Prior Publication Data

US 2016/0314095 A1    Oct. 27, 2016

(30) Foreign Application Priority Data

Apr. 21, 2015    (KR) .................. 10-2015-0055919

(51) Int. Cl.
| | | |
|---|---|---|
| G06F 1/32 | (2006.01) | |
| G06F 9/48 | (2006.01) | |
| G06F 15/80 | (2006.01) | |
| G06F 1/3206 | (2019.01) | |
| G06F 1/324 | (2019.01) | |
| G06F 1/329 | (2019.01) | |
| G06F 1/3293 | (2019.01) | |
| G06F 1/3296 | (2019.01) | |

(52) U.S. Cl.
CPC .............. *G06F 15/80* (2013.01); *G06F 1/324* (2013.01); *G06F 1/3206* (2013.01); *G06F 1/329* (2013.01); *G06F 1/3293* (2013.01); *G06F 1/3296* (2013.01); *G06F 9/4881* (2013.01); *Y02D 10/122* (2018.01); *Y02D 10/126* (2018.01); *Y02D 10/172* (2018.01); *Y02D 10/24* (2018.01)

(58) Field of Classification Search
CPC ........ G06F 15/80; G06F 1/3206; G06F 1/324; G06F 1/329; G06F 1/3293; G06F 9/4481; G06F 1/3296; Y02B 60/121; Y02B 60/1217; Y02B 60/1285; Y02B 61/144; Y02B 713/30

See application file for complete search history.

(56) References Cited

U.S. PATENT DOCUMENTS

| | | | |
|---|---|---|---|
| 7,516,456 | B2 | 4/2009 | Aguilar, Jr. et al. |
| 8,695,008 | B2 | 4/2014 | Regini et al. |
| 8,862,906 | B2 | 10/2014 | Jeganathan et al. |
| 9,904,394 | B2 * | 2/2018 | Cruz-Hernandez ......... G06F 3/0414 |
| 2004/0098722 | A1 | 5/2004 | Funaki et al. |
| 2012/0144215 | A1 | 6/2012 | Naffziger et al. |
| 2013/0196709 | A1 | 8/2013 | Nho |
| 2014/0104298 | A1 | 4/2014 | Park et al. |

(Continued)

FOREIGN PATENT DOCUMENTS

| | | |
|---|---|---|
| JP | 5234750 B2 | 4/2013 |
| JP | 2014-191499 A | 10/2014 |

*Primary Examiner* — Austin Hicks
(74) *Attorney, Agent, or Firm* — Sughrue Mion, PLLC

(57) ABSTRACT

An application processor includes an application processor including a first processor configured to generate a control signal based on whether user data is changed, wherein the application processor is configured to implement a power manager which dynamically controls power provided to the first processor, in response to the control signal.

14 Claims, 12 Drawing Sheets

(56) References Cited

U.S. PATENT DOCUMENTS

2014/0173150 A1 6/2014 Yu
2014/0184619 A1 7/2014 Kim
2014/0258698 A1 9/2014 Herrera Mejia et al.
2015/0288608 A1* 10/2015 Ara jo ................... G06F 1/3293
370/235

* cited by examiner

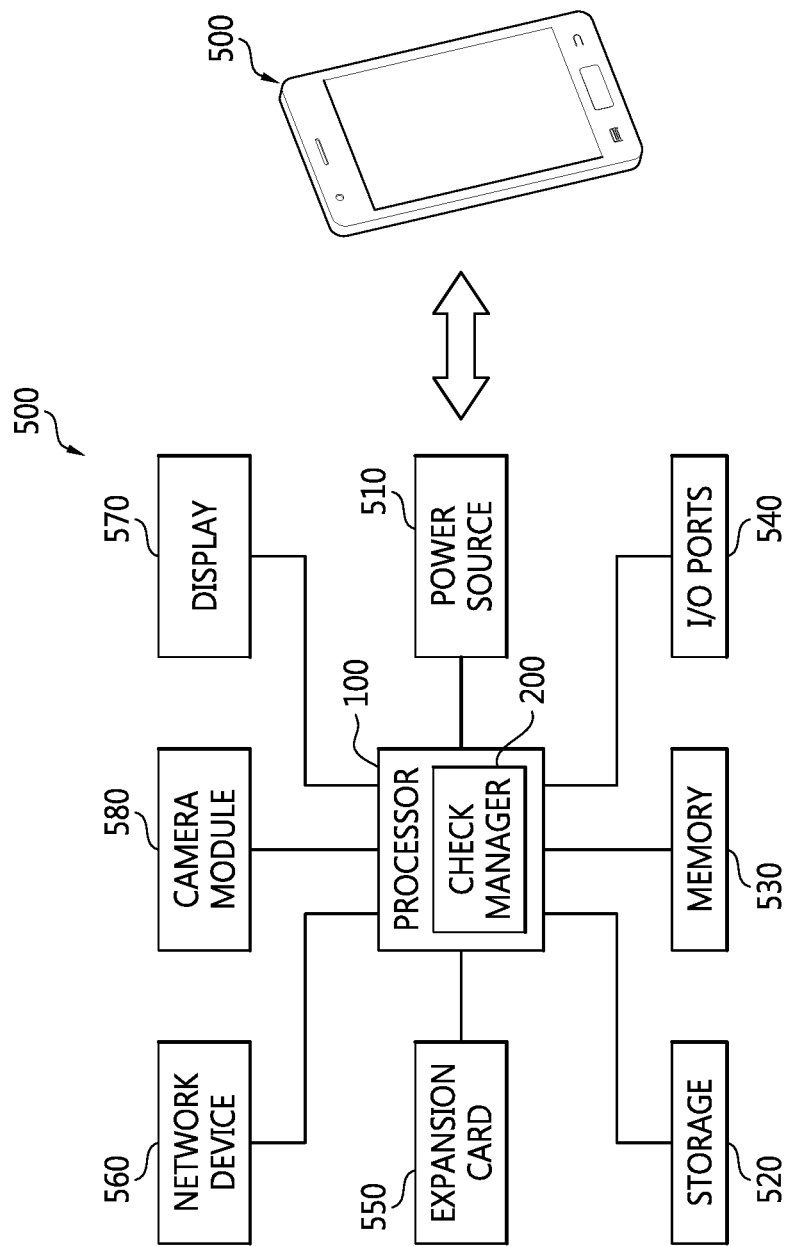

APPLICATION PROCESSOR AND SYSTEM ON CHIP

CROSS-REFERENCE TO RELATED APPLICATION

This application claims priority from Korean Patent Application No. 10-2015-0055919 filed on Apr. 21, 2015, the disclosure of which is incorporated herein in its entirety by reference.

BACKGROUND

Apparatuses and methods consistent with exemplary embodiments relate to an application processor, and more particularly, to an application processor for dynamically controlling power based on a change or no-change of user data that is directly provided for a user and a mobile computing apparatus including the same.

In a system including heterogeneous multi-processors, a scheduler schedules tasks between a high-performance high-power first core and a low-performance low-power second core. The scheduler assigns the first core a task having a large number of given jobs and assigns the second core a task having a small number of given jobs. Accordingly, power consumption of the scheduler is decreased in a system when there are a small number of given jobs and the system can show satisfactory performance due to the scheduler when there are a large number of given jobs. In other words, a conventional scheduler schedules tasks according to the amount of given jobs.

SUMMARY

According to an aspect of an exemplary embodiment, there is provided an application processor including a first processor configured to generate a control signal based on whether user data is changed, wherein the application processor is configured to implement a power manager which dynamically controls power provided to the first processor, in response to the control signal.

The application processor may further include a second processor, and the first processor may be configured to generate the control signal by implementing a check manager, and the check manager may include: a checker which generates an indication signal indicating whether the user data is changed; and a scheduler which generates a reference value control signal in response to the indication signal, the reference value control signal controlling a reference value that is used for transitioning a task between the first processor and the second processor.

The first processor and the second processor may be heterogeneous multiprocessors.

The scheduler may generate the reference value control signal such that the reference value is maintained or decreased, in response to the indication signal indicating that the user data is changed, and the scheduler may generate the reference value control signal such that the reference value is increased, in response to the indication signal indicating that the user data is not changed.

The check manager may further include a migrator which migrates a task, the task corresponding to the user data, from the first processor to the second processor in response to the reference value control signal output from the scheduler.

The first processor may generate the control signal by executing a check manager, and the check manager may include: a checker which generates an indication signal indicating whether the user data is changed; and a task execution interval controller which controls an execution interval of a task, the task corresponding to the user data, in response to the indication signal.

The application processor may further include a second processor, the first processor may be configured to generate the control signal by implementing a check manager, and the check manager may include: a checker which generates an indication signal indicating whether the user data is changed; and a hot plug processor which determines whether to operate at least one of the first processor and the second processor based on the indication signal.

The application processor may be further configured to implement a clock manager which dynamically controls a clock signal applied to the first processor in response to the control signal, the first processor may be configured to generate the control signal by implementing a check manager, and the check manager may include: a checker which generates an indication signal, indicating whether the user data is changed; and a dynamic voltage and frequency scaling (DVFS) controller which controls a DVFS of the first processor based on the indication signal.

The user data may include at least one of image data and non-image data.

According to an aspect of another exemplary embodiment, there is provided a system on chip, including: a memory configured to store a check manager; and a first processor configured to implement the check manager, wherein, when the check manager is implemented by the first processor, the check manager causes the first processor to generate a control signal based on whether user data is changed, and wherein the system on chip is configured to implement a power manager which dynamically controls power provided to the first processor, in response to the control signal.

The system on chip may further include a second processor, and the check manager may include: a checker which generates an indication signal indicating whether the user data is changed; and a scheduler which generates a reference value control signal in response to the indication signal, the reference value control signal controlling a reference value that is used for transitioning a task between the first processor and the second processor.

The first processor and the second processor may be heterogeneous multiprocessors.

The scheduler may generate the reference value control signal such that the reference value is maintained or decreased, in response to the indication signal indicating that the user data is changed, and the scheduler may generate the reference value control signal such that the reference value is increased, in response to the indication signal indicating that the user data is not changed.

The check manager may include a checker which generates an indication signal indicating whether the user data is changed; and a task execution interval controller which controls an execution interval of a task, the task corresponding to the user data, in response to the indication signal.

The system on chip may further include a second processor, and the check manager may include a checker which generates an indication signal indicating whether the user data is changed; and a hot plug processor which determines whether to operate at least one of the first processor and the second processor based on the indication signal.

According to an aspect of still another exemplary embodiment, there is provided a computing apparatus including: at least one memory operable to store program code; and at least one processor operable to read the program code and operate as instructed by the program code, wherein the program code causes the at least one processor to detect whether user data is changed, and causes the at least one processor to dynamically control power that is provided to the at least one processor, in response to a result of detecting whether the user data is changed.

The at least one processor may include a first processor that consumes lower power and a second processor that consumes higher power, and the program code may cause the at least one processor to dynamically control the power by controlling such that an increased volume of a task, the task corresponding to the user data, is performed by the first processor in response to detecting that the user data is not changed.

The program code may cause the at least one processor to dynamically control the power by controlling such that a task corresponding to the user data, the task previously executed at a predetermined period, is executed in response to detecting that the user data is changed and is not executed in response to detecting that the user data is not changed.

The at least one processor may include a first processor that consumes lower power and a second processor that consumes higher power, and the program code may cause the at least one processor to dynamically control the power by controlling such that at least one of the first processor and the second processor is operated based on a workload of a task, the task corresponding to the user data, in response to detecting that the user data is changed.

The program code may cause the at least one processor to dynamically control the power by controlling a frequency of a clock signal applied to the at least one processor based on a frequency load of a task, the task corresponding to the user data, in response to detecting that the user data is changed.

BRIEF DESCRIPTION OF THE DRAWINGS

The above and/or other aspects will be more apparent by describing certain example embodiments with reference to the accompanying drawings in which:

FIG. 12 is a schematic block diagram of an electronic system including a controller according to an exemplary embodiment.

DETAILED DESCRIPTION

Figure 1:
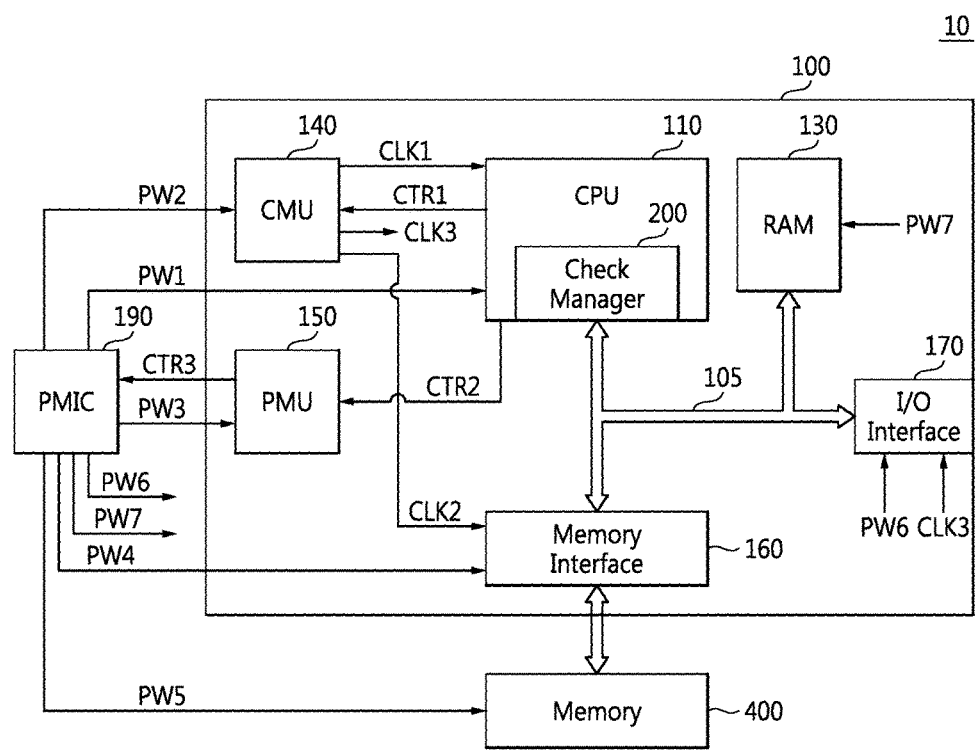
FIG. 1 is a schematic block diagram of a computing apparatus according to an exemplary embodiment.

The inventive concept now will be described more fully hereinafter with reference to the accompanying drawings, in which certain exemplary embodiments are shown. The inventive concept may, however, be embodied in many different forms and should not be construed as limited to the exemplary embodiments set forth herein. Rather, these exemplary embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Hereinafter, the term "module" may indicate a hardware component which performs a function and an operation corresponding to its name, a computer program code for executing particular function and operation, or an electronic recording medium, e.g., a processor, equipped with the computer program code. In other words, the module may be a functional and/or structural combination of hardware for realizing the inventive concept and/or software for running the hardware.

FIG. 1 is a schematic block diagram of a computing apparatus 10 according to an exemplary embodiment. The computing apparatus 10 may include a controller 100, a power management integrated circuit (PMIC) 190, and a memory 400. The computing apparatus 10 may include a personal computer (PC) or a mobile computing apparatus. The mobile computing apparatus may include a laptop computer, a cellular phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, or an e-book.

The controller 100 may control the operations of the PMIC 190 and the memory 400. The controller 100 may be implemented as a host, an integrated circuit (IC), a motherboard, a system on chip (SoC), an application processor (AP), or a mobile AP. When the controller 100 is implemented in a first package including an SoC, an AP, or a mobile AP and the memory 400 is implemented in a second package; the second package may be stacked over the first package using stack balls. The controller 100 may include a bus architecture 105, a central processing unit (CPU) 110, an internal memory 130, a clock management unit (CMU) 140, a power management unit (PMU) 150, a memory interface 160, and an input/output (I/O) interface 170.

The bus architecture 105 may be implemented as an advanced microcontroller bus architecture (AMBA), an advanced high-performance bus (AHB), an advanced peripheral bus (APB), an advanced extensible interface (AXI), AXI coherency extensions (ACE), an advanced system bus (ASB), or a combination thereof, but the inventive concept is not limited to these examples.

The CPU 110 may execute a check manager 200. A power management method controlled according to the check manager 200 executed by a master, i.e., the CPU 110 may be applied to the controller 100.

The check manager 200 is a program or firmware executed by the CPU 110. The check manager 200 may check on a change or no-change in user data for a user (i.e., whether the user data for a user has changed) and may generate a control signal for controlling the power of the controller 100 based on the check result. The check manager 200 executed by the CPU 110 may generate control signals for providing power and/or frequency for the CPU 110, the memory interface 160, and the I/O interface 170. In addition, the check manager 200 may control a voltage and frequency for the CPU 110, the memory interface 160, and the I/O interface 170 according to dynamic voltage and frequency scaling (DVFS).

The user data may include information or data which is provided to a user directly or through the computing apparatus 10 such that the user can see, hear, or feel based on the information or data. The user data may include image data or non-image data. The image data may be visual data such as an update of user interface (UI), a light source, and/or an image frame. The non-image data may be non-visual data including voice, sound, and/or vibration.

The CMU 140 may adjust a first frequency of a first clock signal CLK1 applied to the CPU 110, a second frequency of a second clock signal CLK2 applied to the memory interface 160, and/or a third frequency of a third clock signal CLK3 applied to the I/O interface 170 in response to a first control signal CTR1 output from the CPU 110 or output from the check manager 200 executed by the CPU 110. Here, the adjusting of a frequency may include increasing, maintaining, or decreasing the frequency.

The PMU 150 may generate a third control signal CTR3 for controlling the operation of the PMIC 300 in response to a second control signal CTR2 output from the CPU 110 or output from the check manager 200 executed by the CPU 110.

The memory interface 160 may control a write or read operation on the memory 400 according to the control of the CPU 110. In detail, the memory interface 160 may control the write or read operation on the memory 400 based on the second frequency of the second clock signal CLK2 output from the CMU 140 and the level of a fourth operating voltage PW4 output from the PMIC 300. The second frequency of the second clock signal CLK2 and the level of the fourth operating voltage PW4 may be adjusted according to dynamic voltage and frequency scaling (DVFS).

Although one memory interface 160 and one memory 400 are shown in FIG. 1, the memory interface 160 may be a set of different memory interfaces and the memory 400 may be a set of different memories. When the memory 400 is a set of a dynamic random access memory (DRAM) and a flash memory (e.g., NAND-type or NOR-type flash memory), the memory interface 160 may be a set of a DRAM controller and a flash memory controller, but the inventive concept is not limited to this example.

The memory 400 may include a volatile memory and/or a non-volatile memory. The volatile memory may include a random access memory (RAM), a DRAM, a static RAM (SRAM), a synchronous DRAM (SDRAM), a thyristor RAM (T-RAM), a zero capacitor RAM (Z-RAM), or a twin transistor RAM (TTRAM). The non-volatile memory may include an electrically erasable programmable read-only memory (EEPROM), flash memory, a magnetic RAM (MRAM), a spin-transfer torque MRAM, a ferroelectric RAM (FeRAM), a phase-change RAM (PRAM), a resistive RAM (RRAM), a nanotube RRAM, a polymer RAM (PoRAM), a nano floating gate memory (NFGM), a holographic memory, a molecular electronics memory device, or an insulator resistance change memory. Alternatively, the memory 400 may be implemented as a solid state drive or solid state disk (SSD), an embedded SSD (eSSD), a multimedia card (MMC), an embedded MMC (eMMC), or a universal flash storage (UFS), but the inventive concept is not limited to these examples.

The PMIC 190 may adjust the level of each of operating voltages PW1 through PW7 in response to the third control signal CTR3. In detail, in response to the third control signal CTR3, the PMIC 190 may adjust the level of a first operating voltage PW1 applied to the CPU 110, the level of a second operating voltage PW2 applied to the CMU 140, the level of a third operating voltage PW3 applied to the PMU 150, the level of the fourth operating voltage PW4 applied to the memory interface 160, the level of a fifth operating voltage PW5 applied to the memory 400, the level of a sixth operating voltage PW6 applied to the I/O interface 170, and the level of a seventh operating voltage PW7 applied to the internal memory 130.

Each of the control signals CTR1, CTR2, and CTR3 may include at least one analog signal or at least one digital signal.

The I/O interface 170 is an interface for inputting and outputting data. The I/O interface 170 may transmit or receive data based on the third clock signal CLK3 output from the CMU 140 and the sixth operating voltage PW6 output from the PMIC 300. The third frequency of the third clock signal CLK3 and the level of the sixth operating voltage PW6 may be adjusted according to DVFS. The I/O interface 170 may be configured to support serial advanced technology attachment (SATA), an SATA express (SATAe), an SAS (serial attached small computer system interface (SCSI)), a peripheral component interconnect express (PCIe), or mobile industry processor interface (MIPI®), but the inventive concept is not limited to these examples.

The internal memory 130 may be an operation memory of the CPU 110. The internal memory 130 may be an ROM or an SRAM but is not limited thereto. When the memory 400 includes a non-volatile memory, the check manager 200 stored in the memory 400 may be loaded to the internal memory 130 and executed by the CPU 110 when the computing apparatus 10 is booted.

Figure 2:
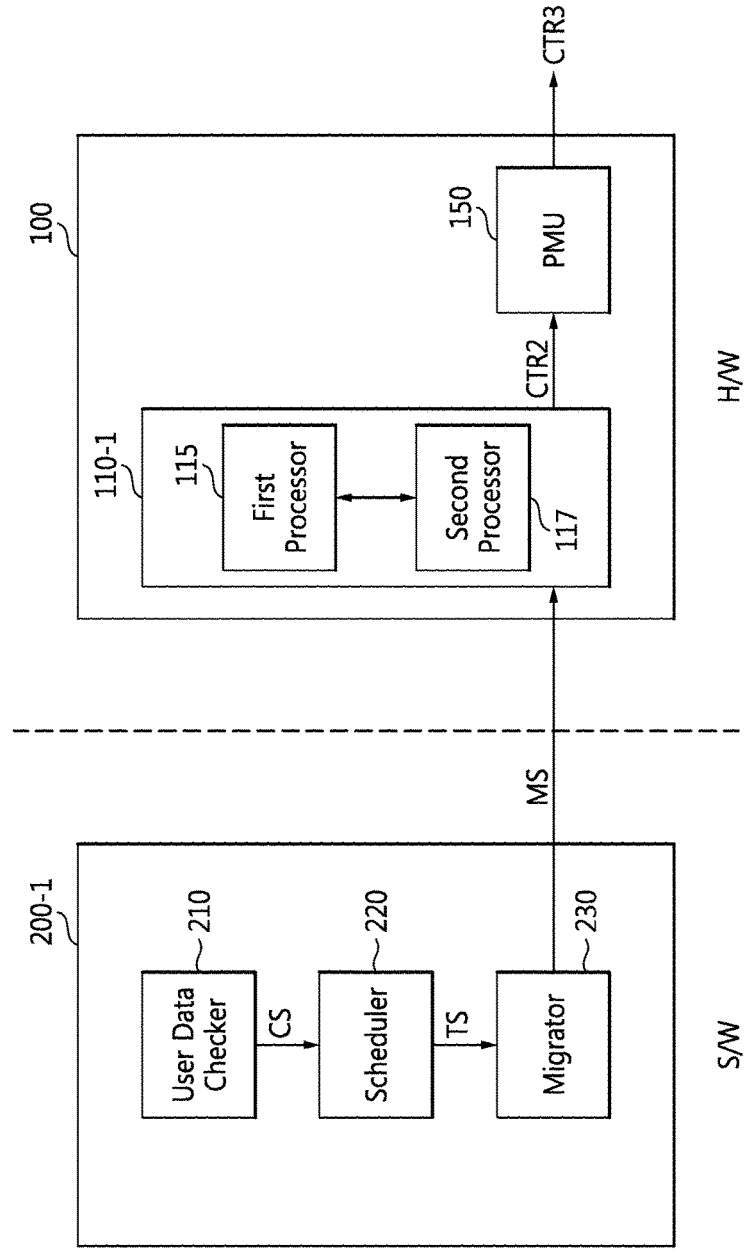
FIG. 2 is a block diagram for explaining a power management method of a controller according to an exemplary embodiment.

FIG. 2 is a block diagram for explaining a power management method of the controller 100 according to an exemplary embodiment. In an exemplary embodiment, check managers 200, 200-1, 200-2, 200-3, 200-4, and 200-5 (refer to FIGS. 2-7) may be implemented in software (S/W) or firmware. The check managers 200, 200-1, 200-2, 200-3, 200-4, and 200-5 may be implemented as a program and may be loaded to the memory 130 or 400 and may be executed by the CPU 110 when the operating voltages PW1 through PW7 are applied to the controller 100. An operating system (OS) and middleware may be intervened between the check managers 200, 200-1, 200-2, 200-3, 200-4, and 200-5 and the controller 100.

Referring to FIGS. 1 and 2, the check manager 200-1 may include a user data checker 210, a scheduler 220, and a migrator 230. The check manager 200-1 may perform functions substantially the same as or similar to those performed by the check manager 200 illustrated in FIG. 1. The check manager 200-1 may check on a change or no-change in user data for a user and may generate a control signal (or a migration signal) MS.

The user data checker 210 may check on a change or no-change in user data for a user and may generate an indication signal CS. The user data checker 210 may be implemented as surface flinger in Android OS, but the inventive concept is not limited to this example. The indication signal CS may indicate a change or no-change in the user data. In other words, the indication signal CS may indicate that the user data is changed or that the user data is not changed.

The scheduler 220 may adjust a reference value for task transition between a first processor 115 and a second processor 117 in response to the indication signal CS. The task transition may refer to migration of a task that is executed or to be executed by the first processor 115 to the second processor 117 or migration of a task that is executed or to be executed by the second processor 117 to the first processor 115.

The first processor 115 and the second processor 117 may be heterogeneous multiprocessors in an exemplary embodiment but may be homogeneous multiprocessors in other exemplary embodiments. The first processor 115 may be a low-performance and low-power processor and the second processor 117 may be high-performance and high-power processor.

A task transition reference value may be a reference value base on which a particular task is migrated from the first processor 115 to the second processor 117. For instance, when the workload of a task is greater than the task transition reference value, the task may be migrated from the first processor 115 to the second processor 117. When the workload of a task is less than the task transition reference value, the task may be executed by the first processor 115.

The scheduler 220 may increase the task transition reference value when the indication signal CS indicates that the user data is not changed and may maintain or decrease the task transition reference value when the indication signal CS indicates that the user data is changed. In other words, when there is no change in the user data, the scheduler 220 may control the low-power first processor 115 to execute the task and may reduce power consumption of the first processor 115.

The scheduler 220 may generate a reference value control signal TS in response to the indication signal CS and may send the reference value control signal TS to the migrator 230. In detail, when the user data is changed, the scheduler 220 may send the reference value control signal TS indicating the maintenance or decrease of the task transition reference value to the migrator 230. When the user data is not changed, the scheduler 220 may send the reference value control signal TS indicating the increase of the task transition reference value to the migrator 230.

The migrator 230 may determine whether to migrate a task corresponding to the user data from the first processor 115 to the second processor 117 in response to the reference value control signal TS. The migrator 230 may be implemented as a heterogeneous multiprocessing (HMP) scheduler.

The migrator 230 may determine the workload of the task corresponding to the user data in response to the reference value control signal TS and may migrate the task from the first processor 115 to the second processor 117 according to the determination result. When the user data is changed, the migrator 230 may migrate the task corresponding to the user data from the first processor 115 to the second processor 117 based on the task transition reference value that has been maintained or decreased. When the user data is not changed, the migrator 230 may migrate the task corresponding to the user data from the first processor 115 to the second processor 117 based on the task transition reference value that has been increased.

The migrator 230 may send the migration signal MS to a CPU 110-1 of the controller 100. The migration signal MS controls the migration of a task from the first processor 115 to the second processor 117.

The CPU 110-1 may include the first processor 115 and the second processor 117. The CPU 110-1 may be implemented in a manner substantially the same as or similar to the CPU 110 illustrated in FIG. 1. The CPU 110-1 may operate at least one among the first processor 115 and the second processor 117 in response to the migration signal MS. Although two processors are included in the CPU 110-1 in the embodiment illustrated in FIG. 2, the number or type of processors included in the CPU 110-1 is not limited to the this exemplary embodiment.

The CPU 110-1 may control the PMU 150 to operate at least one among the first processor 115 and the second processor 117. In detail, to operate at least one among the first processor 115 and the second processor 117, the CPU 110-1 may send the second control signal CTR2 to the PMU 150. The PMU 150 may send the third control signal CTR3 to the PMIC 190 according to the control of the CPU 110-1. The PMIC 190 may supply the CPU 110-1 with power for operating at least one among the first processor 115 and the second processor 117 based on the third control signal CTR3.

Figure 3:
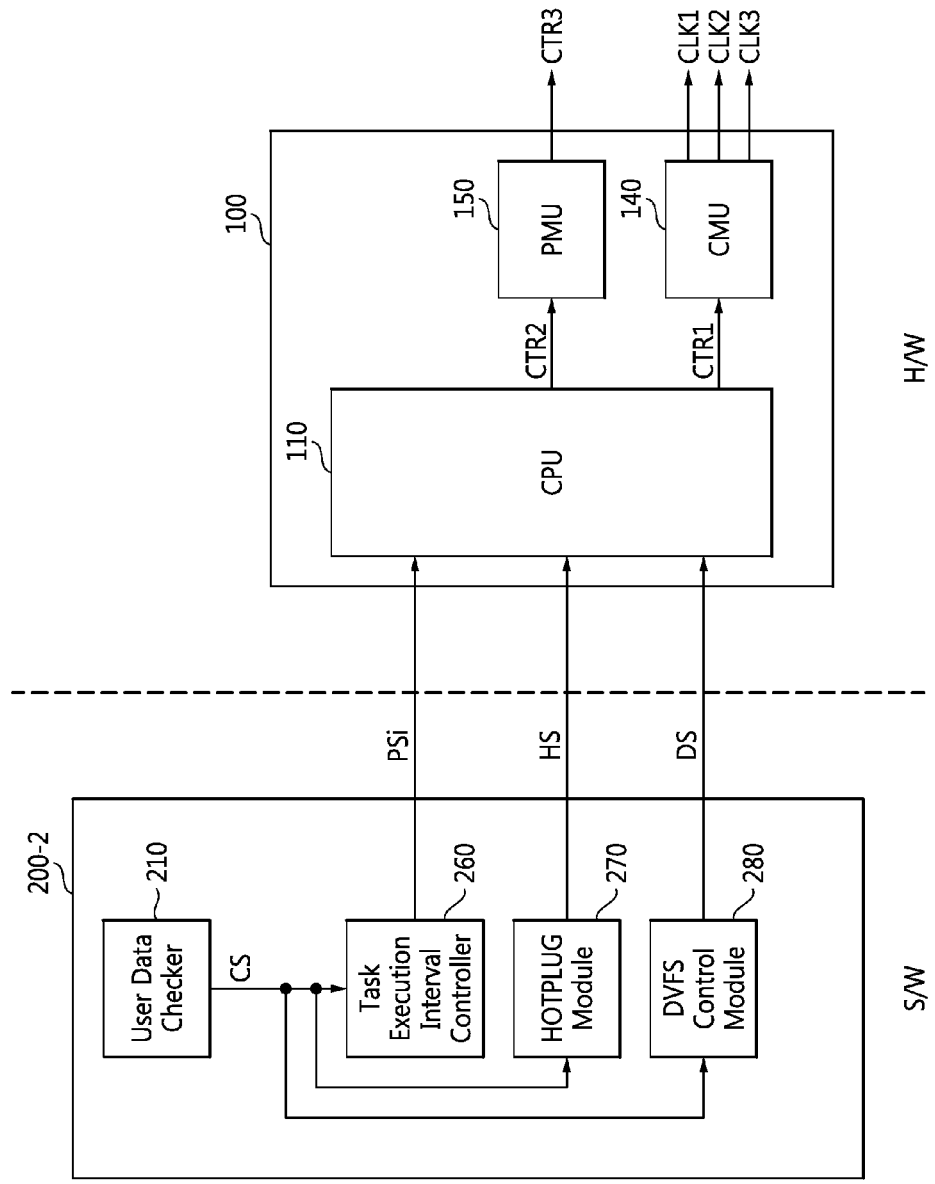
FIG. 3 is a block diagram for explaining a power management method of a controller according to another exemplary embodiment.

FIG. 3 is a block diagram for explaining a power management method of the controller 100 according to another exemplary embodiment. Referring to FIGS. 1 and 3, the check manager 200-2 may include the user data checker 210, a task execution interval controller 260, a hot plug module 270, and a DVFS control module 280.

The check manager 200-2 may perform functions substantially the same as or similar to those performed by the check manager 200 illustrated in FIG. 1. The check manager 200-2 may check on a change or no-change in user data for a user and may generate control signals PSi, HS, and DS, where i is a natural number equal to or greater than one.

The user data checker 210 may check on a change or no-change in user data for a user and may generate the indication signal CS according to the check result. The user data checker 210 may send the indication signal CS to the task execution interval controller 260, the hot plug module 270, and/or the DVFS control module 280 sequentially or at the same time.

The task execution interval controller 260 may control an interval at which a task is executed by the CPU 110 in response to the indication signal CS. In other words, the task execution interval controller 260 may control an execution interval of a task corresponding to the user data in response to the indication signal CS. The task execution interval controller 260 may generate and send a task control signal PSi for controlling the execution interval of a task to the CPU 110. The operation of the task execution interval controller 260 will be described in detail later with reference to FIG. 4.

When the CPU 110 includes multiprocessors (or multi-core processors), the hot plug module 270 may control operation or non-operation of the multiprocessors in response to the indication signal CS. The hot plug module 270 may generate and send a hot plug control signal HS for controlling operation or non-operation of the multiprocessors to the CPU 110. The operation of the hot plug module 270 will be described in detail later with reference to FIG. 5.

The DVFS control module 280 may control DVFS of the controller 100 based on the indication signal CS. In detail, the DVFS control module 280 may control DVFS of the CPU 110 based on the indication signal CS. The DVFS control module 280 may also control DVFS of the memory interface 160 and the I/O interface 170 based on the indication signal CS. The DVFS control module 280 may generate and send a DVFS control signal DS for the CPU 110, the memory interface 160, and/or the I/O interface 170 to the CPU 110.

Although the check manager 200-2 includes the task execution interval controller 260, the hot plug module 270, and the DVFS control module 280 in the exemplary embodiment illustrated in FIG. 3, the inventive concept is not limited to this exemplary embodiment. The check manager 200-2 may be configured to include at least one among the task execution interval controller 260, the hot plug module 270, and the DVFS control module 280 in other exemplary embodiments.

The CPU 110 may control the PMU 150 and the CMU 140 in response to the control signals PSi, HS, and DS received from the check manager 200-2. In detail, the CPU 110 may send the first control signal CTR1 to the CMU 140 and the second control signal CTR2 to the PMU 150 in response to the control signals PSi, HS, and DS.

The CMU 140 may control the frequency of each of the clock signals CLK1, CLK2, and CLK3 respectively applied to the CPU 110, the memory interface 160, and the I/O interface 170 in response to the first control signal CTR1. The PMU 150 may control power supplied to the controller 100 in response to the second control signal CTR2 and may send the third control signal CTR3 to the PMIC 190.

Figure 4:
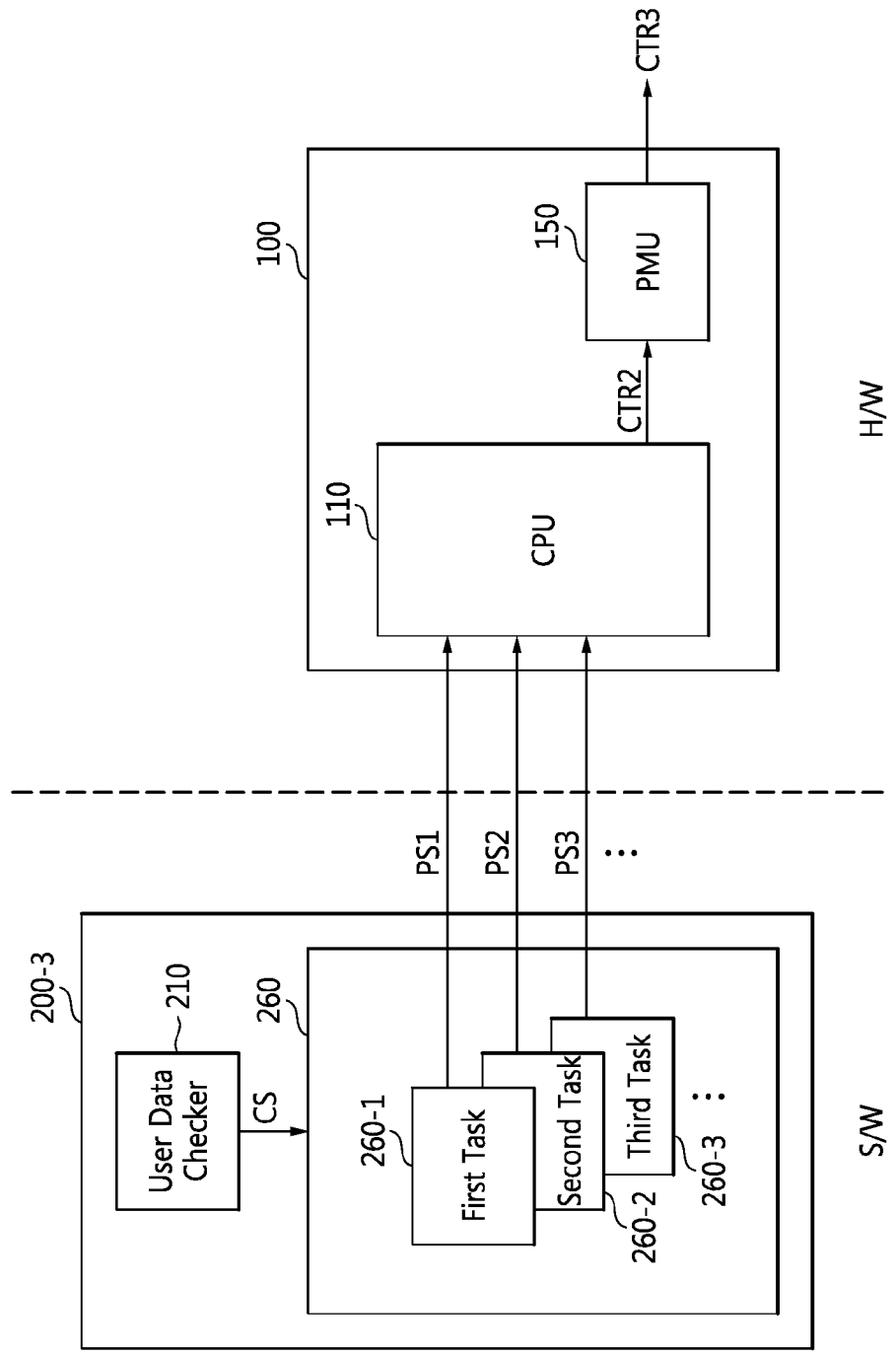
FIG. 4 is a block diagram for explaining an operation of a task execution interval controller illustrated in FIG. 3.

FIG. 4 is a block diagram for explaining the operation of the task execution interval controller 260 illustrated in FIG. 3. Referring to FIGS. 1, 3, and 4, the check manager 200-3 may include the user data checker 210 and the task execution interval controller 260. The check manager 200-3 may perform functions substantially the same as or similar to those performed by the check manager 200 illustrated in FIG. 1. The check manager 200-3 may check on a change or no-change in user data and may send the control signal PSi (PS1, PS2, PS3, . . . ) to the CPU 110.

The user data checker 210 may check on a change or no-change in user data and may send the indication signal CS to the task execution interval controller 260. The task execution interval controller 260 may control an execution interval of a task executed by the CPU 110. The task execution interval controller 260 may change or delay the execution interval of a task such that the task is executed from a time point when the user data is changed to a time point when the task is completed. The task execution interval controller 260 may include a plurality of task execution interval control modules 260-1 through 260-N, where N is a natural number equal to or greater than two.

Each of the task execution interval control modules 260-1 through 260-N may control the execution interval of a task executed by the CPU 110. For instance, the first task execution interval control module 260-1 may control the execution interval of a first task, the second task execution interval control module 260-2 may control the execution interval of a second task, and the third task execution interval control module 260-3 may control the execution interval of a third task. Here, controlling the execution interval of a task may include increasing, maintaining, or decreasing the execution interval of a task. Each of the tasks may be a temperature checking task, a timer checking task, a timer checking task, or the like which is normally periodically performed in the CPU 110.

The task execution interval controller 260 may send the CPU 110 the task interval control signals PSi respectively generated from the task execution interval control modules 260-1 through 260-N. The CPU 110 may control the execution interval of each task in response to one of the task interval control signals PSi.

In detail, the CPU 110 may control the PMU 150 in response to at least one of the task interval control signals PSi. The CPU 110 may change the execution interval of at least one task and may send the second control signal CTR2 to the PMU 150 according to the changed execution interval of the task. The PMU 150 may send the third control signal CTR3 to the PMIC 190 in response to the second control signal CTR2.

Figure 5:
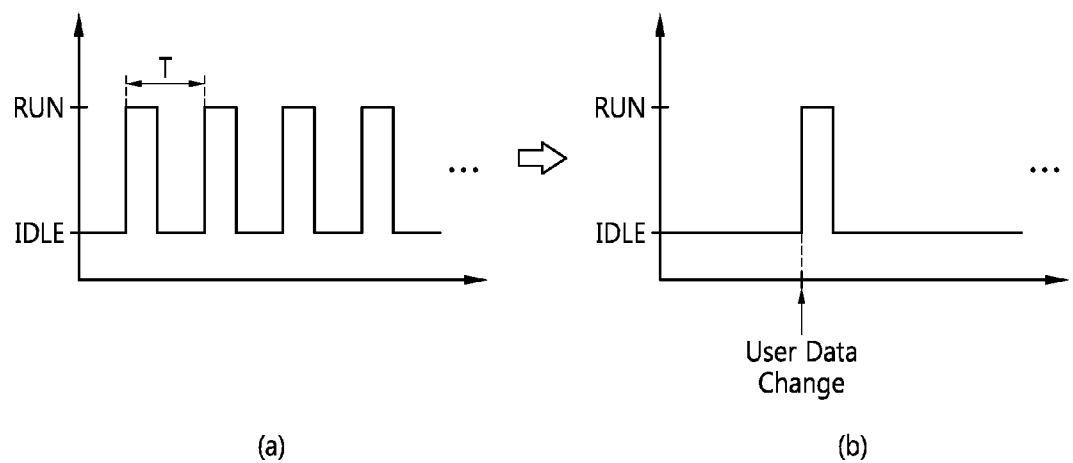
FIG. 5 shows graphs to explain an operation of the task execution interval controller illustrated in FIG. 4.

FIG. 5 shows graphs to explain the operation of the task execution interval controller 260 illustrated in FIG. 4. Referring to FIGS. 4 and 5, a graph (a) illustrates that a task is periodically executed by the CPU 110. That is, in the graph (a), the CPU 110 controls the task to be executed at a fixed interval T. The CPU 110 may change the interval T of a task corresponding to user data. In FIG. 5, an idle state is a state in which the task is not executed and a run state is a state in which the task is run.

The task execution interval controller 260 may control the execution interval of a task. In detail, referring to a graph (b), the task execution interval controller 260 may change or delay the execution interval of the task such that the execution interval is from a time point at which the user data is changed to a time point at which the task is completed in response to the indication signal CS. In other words, the task execution interval controller 260 may control the execution interval so that the task is run when the user data is changed and that the task is not run when the user data is not changed. The task execution interval controller 260 may increase the execution interval when the user data is not changed. In other words, when the user data is not changed, the task execution interval controller 260 may increase the interval at which the task is performed, so that the power consumption of the CPU 110 is decreased.

Figure 6:
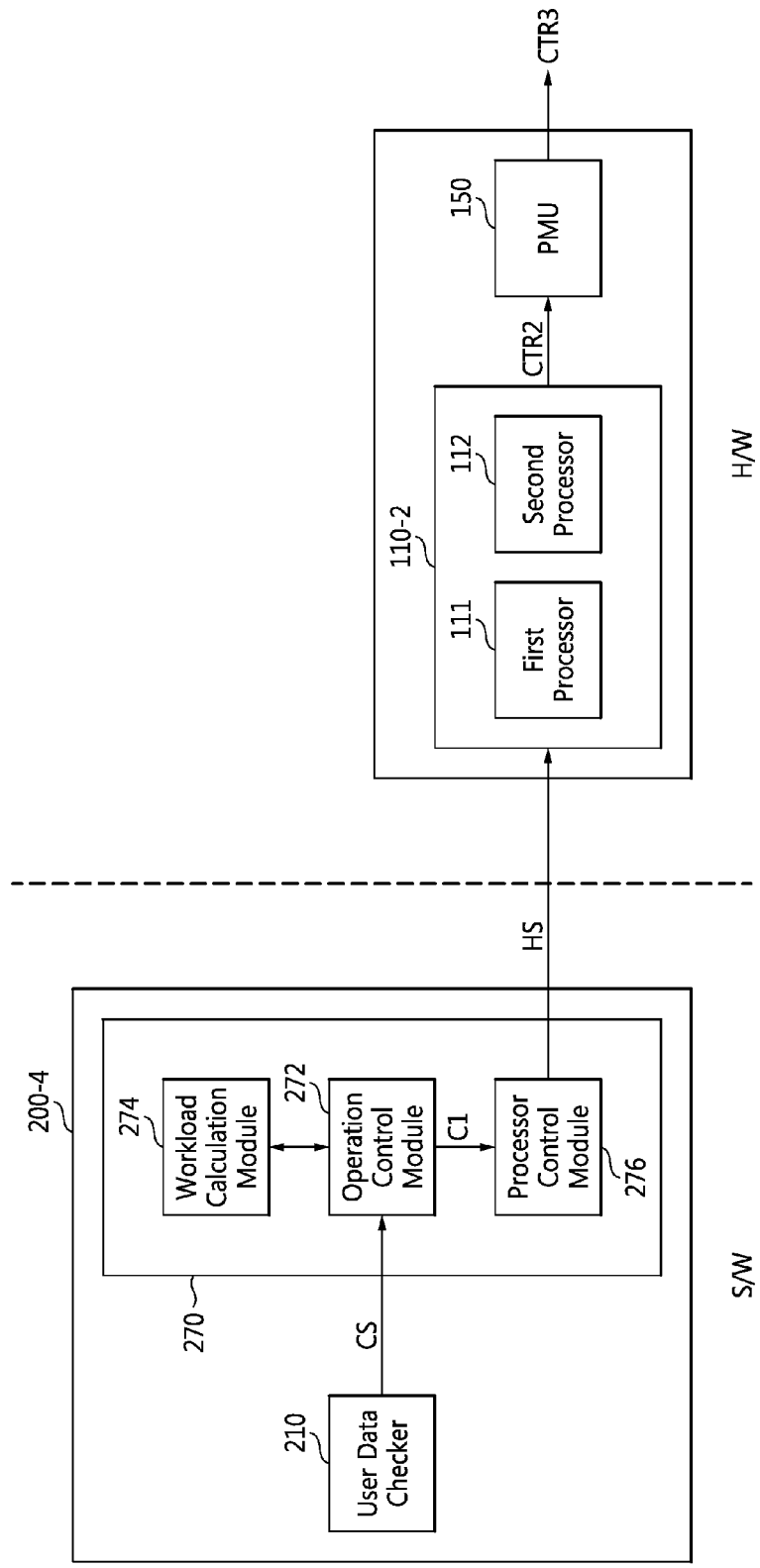
FIG. 6 is a block diagram for explaining an operation of a hot plug module illustrated in FIG. 3.

FIG. 6 is a block diagram for explaining the operation of the hot plug module 270 illustrated in FIG. 3. Referring to FIGS. 1, 3, and 6, the check manager 200-4 may include the user data checker 210 and the hot plug module 270.

The check manager 200-4 may perform functions substantially the same or similar to as those performed by the check manager 200 illustrated in FIG. 1. The check manager 200-4 may check on a change or no-change in user data and may send the control signal HS to a CPU 110-2.

The user data checker 210 may check on a change or no-change in user data and send the indication signal CS to the hot plug module 270. The hot plug module 270 may determine operation or non-operation of multiprocessors (or multi-core processors), e.g., a first processor 111 and a second processor 112 included in the CPU 110. For example, the hot plug module 270 may operate the first and second processors 111 and 112 simultaneously or may stop the operation of the second processor 112. The first processor 111 and the second processor 112 may be homogeneous or heterogeneous.

The hot plug module 270 may control the operation of the first and second processors 111 and 112 in response to the indication signal CS. When there is no change in the user data, the hot plug module 270 may control only one of the first and second processors 111 and 112 to operate. When there is a change in the user data, the hot plug module 270 may determine the workload of a task corresponding to the user data and may determine whether to operate the first and second processors 111 and 112 based on the determination result.

The hot plug module 270 may include an operation control module 272, a workload calculation module 274, and a processor control module 276. The operation control module 272 may control the overall operation of the hot plug module 270. For instance, the operation control module 272 may control the operation of the hot plug module 270 in response to the indication signal CS.

When the indication signal CS indicates that the user data is changed, the operation control module 272 may control a workload determination interval at which the workload of a task is determined. When the indication signal CS indicates that the user data is not changed, the operation control module 272 may control only one of the first and second processors 111 and 112 to operate.

In detail, when the indication signal CS indicates that the user data is changed, the operation control module 272 may change the workload determination interval at which the workload of the task is determined to be from a time point at which the user data is changed to a time point at which only one of the first and second processors 111 and 112 in the CPU 110-2 operates. The workload calculation module 274 may calculate the workload of the task according to the control of the operation control module 272. The workload may be a load of the task on the first processor 111 and/or the second processor 112.

The operation control module 272 may receive the workload of the task calculated by the workload calculation module 274 and send a processor control signal C1 to the processor control module 276 based on the received workload. The processor control signal C1 is a signal for controlling the operation of the first and second processors 111 and 112. The processor control module 276 may send the hot plug control signal HS to the CPU 110-2 in response to the processor control signal C1. The CPU 110-2 may receive the hot plug control signal HS and control the operation of the first and second processors 111 and 112 in response to the hot plug control signal HS.

The CPU 110-2 may be implemented to be substantially the same as or similar to the CPU 110 illustrated in FIG. 1, but the CPU 110-2 may be implemented as a multi-core processor including the first processor 111 and the second processor 112. Although the CPU 110-2 includes the first processor 111 and the second processor 112 in the exemplary embodiment illustrated in FIG. 6, the number or type of processors included in the CPU 110-2 is not limited to this example.

The CPU 110-2 may control the PMU 150 in response to the hot plug control signal HS. In detail, the CPU 110-2 may send the second control signal CTR2 to the PMU 150 in response to the hot plug control signal HS. The PMU 150 may send the third control signal CTR3 to the PMIC 190. The PMIC 190 may supply power to the CPU 110-2 in response to the third control signal CTR3.

Figure 7:
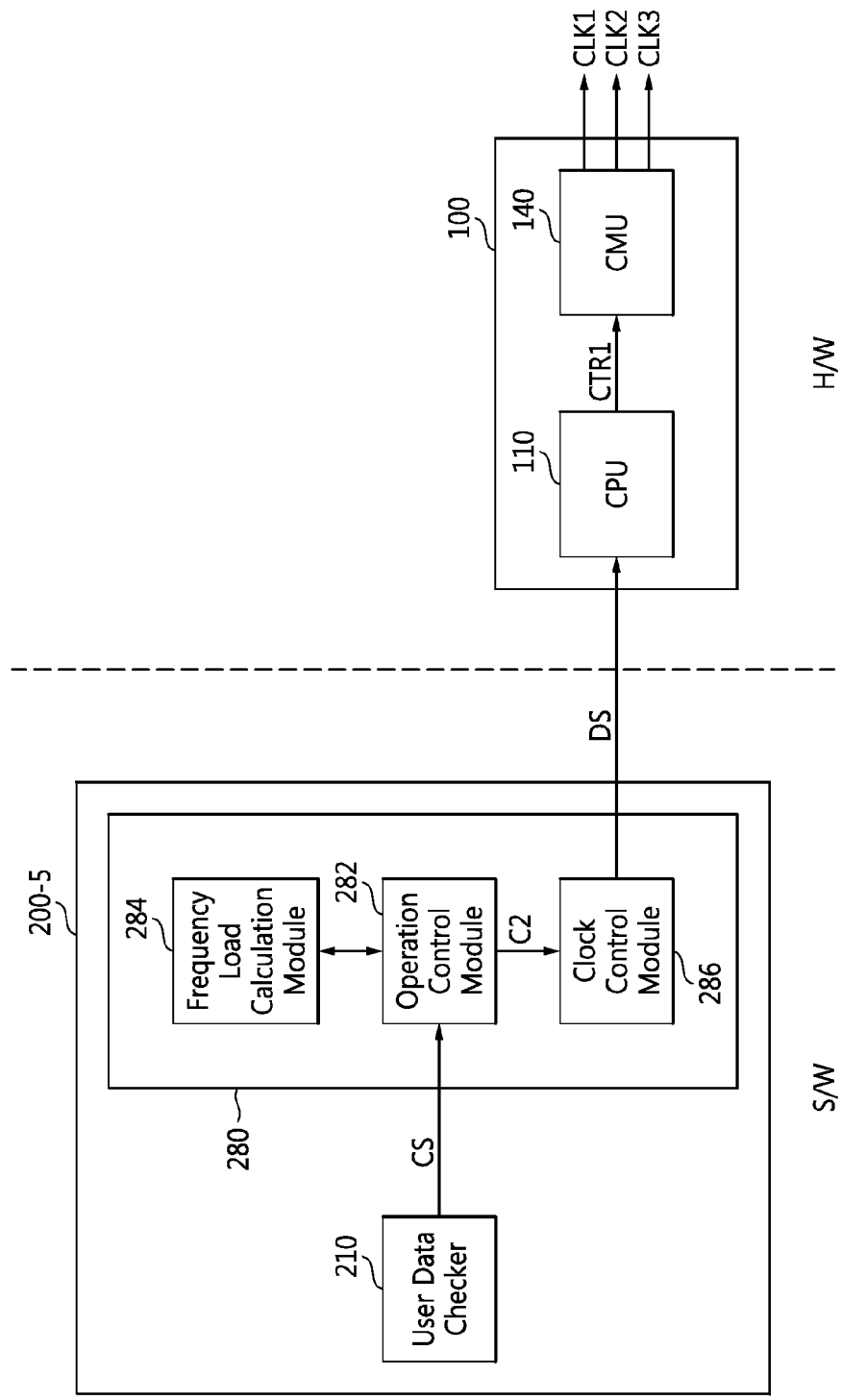
FIG. 7 is a block diagram for explaining an operation of a dynamic voltage and frequency scaling (DVFS) control module illustrated in FIG. 3.

FIG. 7 is a block diagram for explaining the operation of the DVFS control module 280 illustrated in FIG. 3. Referring to FIGS. 1, 3, and 7, the check manager 200-5 may include the user data checker 210 and the DVFS control module 280.

The check manager 200-5 may perform functions substantially the same as or similar to those performed by the check manager 200 illustrated in FIG. 1. The check manager 200-5 may check on a change or no-change in user data and may send the control signal DS to the CPU 110.

The user data checker 210 may check on a change or no-change in the user data and send the indication signal CS to the DVFS control module 280. The DVFS control module 280 may dynamically control an operating voltage and a frequency applied to the controller 100. The DVFS control module 280 may dynamically control the frequency of the CPU 110 and may also dynamically control the frequency of the memory interface 160 and the frequency of the I/O interface 170.

In detail, the DVFS control module 280 may dynamically control the frequency of the controller 100 in response to the indication signal CS. When there is no change in the user data, the DVFS control module 280 may operate the controller 100 with a predetermined minimum frequency. When there is a change in the user data, the DVFS control module 280 estimates a frequency (or a frequency usage) needed to process a task corresponding to the user data and determines a frequency based on the estimation result.

The DVFS control module 280 may include an operation control module 282, a frequency load calculation module 284, and a clock control module 286. The operation control module 282 may control the overall operation of the DVFS control module 280. The operation control module 282 may control the operation of the DVFS control module 280 in response to the indication signal CS. The operation control module 282 may also determine a target frequency to be provided for the controller 100 in response to the indication signal CS.

When the indication signal CS indicates that the user data is changed, the operation control module 282 may control an interval at which a frequency needed to process a task is determined. When the indication signal CS indicates that the user data is not changed, the operation control module 282 may control the controller 100 to operate at the predetermined minimum frequency. The predetermined minimum frequency may be a particular frequency at which the controller 100 operates with minimum power. The predetermined minimum frequency and a predetermined minimum voltage may be set by a program or a user.

In detail, the operation control module 282 may change an interval at which a frequency (or a frequency usage) needed to process the task is determined when the indication signal CS indicates that the user data is changed. The interval may be changed from a t time point at which the user data is changed to a time point at which the target frequency becomes the same as the predetermined minimum frequency.

The frequency load calculation module 284 may estimate a frequency load for the task (i.e., a frequency (or a frequency usage) needed to process the task) according to the control of the operation control module 282. The frequency load is a frequency provided for the controller 100 when the task is executed. The operation control module 282 may receive the frequency load estimated by the frequency load calculation module 284 and may send a clock control signal C2 to the clock control module 286 according to the estimation result. The clock control module 286 may send the DVFS control signal DS to the CPU 110. The DVFS control signal DS is a signal for controlling the target frequency of a clock signal.

The CPU 110 may receive the DVFS control signal DS and may dynamically control the target frequency of the clock signal applied to the controller 100 in response to the DVFS control signal DS. The CPU 110 may control the CMU 140 in response to the DVFS control signal DS. In detail, the CPU 110 may send the first control signal CTR1 to the CMU 140 in response to the DVFS control signal DS.

The CMU 140 may control the frequency of the clock signal applied to the controller 100 according to the control of the CPU 110. In detail, the CMU 140 may apply the first clock signal CLK1 having the first frequency to the CPU 110, the second clock signal CLK2 having the second frequency to the memory interface 160, and the third clock signal CLK3 having the third frequency to the I/O interface 170.

Figure 8:
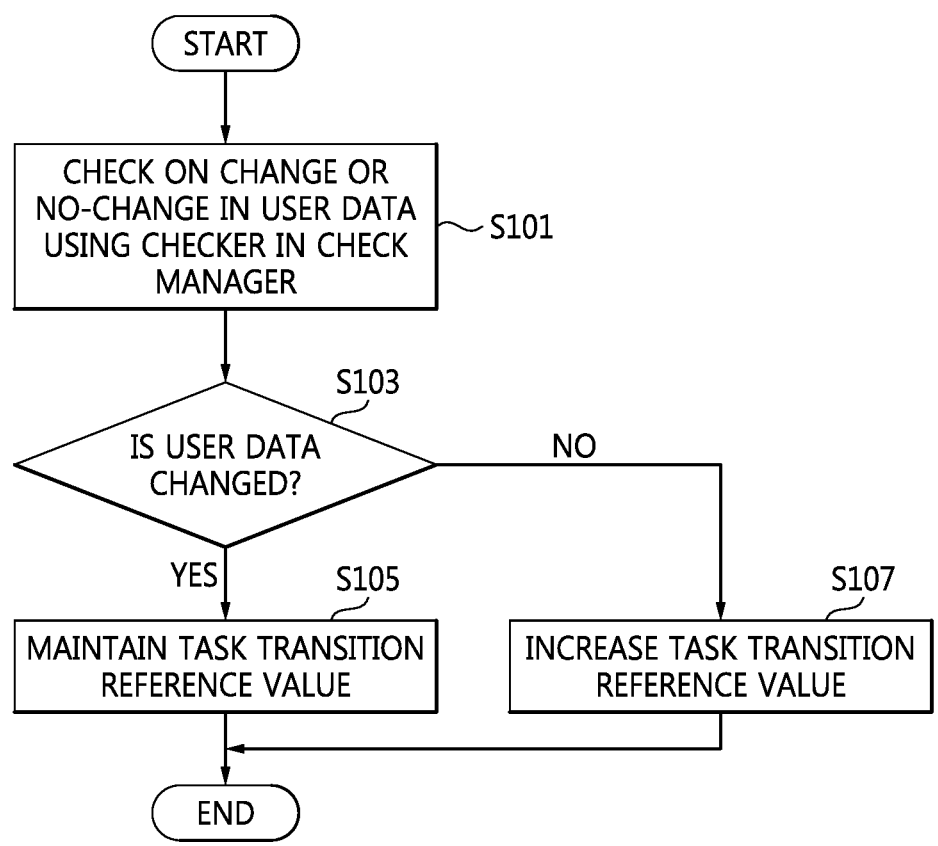
FIG. 8 is a flowchart of the power management method of the controller illustrated in FIG. 2.

FIG. 8 is a flowchart of the power management method of the controller 100 illustrated in FIG. 2. Referring to FIGS. 1, 2, and 8, the check manager 200 or 200-1 which is executed by the CPU 110 of the controller 100 may check on a change or no-change in user data in operation S101. The user data checker 210 included the check manager 200 or 200-1 may determine a change or no-change in the user data and generate the indication signal CS according to the determination result in operation S103.

When the indication signal CS indicates that the user data is changed, the scheduler 220 may maintain the task transition reference value in operation S105. In other exemplary embodiments, when the indication signal CS indicates that the user data is changed, the scheduler 220 may decrease the task transition reference value.

When the indication signal CS indicates that the user data is not changed, the scheduler 220 may increase the task transition reference value between the first processor 115 and the second processor 117 in operation S107. The scheduler 220 may send a changed task transition reference value to the migrator 230. The migrator 230 may migrate the task from the first processor 115 to the second processor 117 based on the changed task transition reference value.

Figure 9:
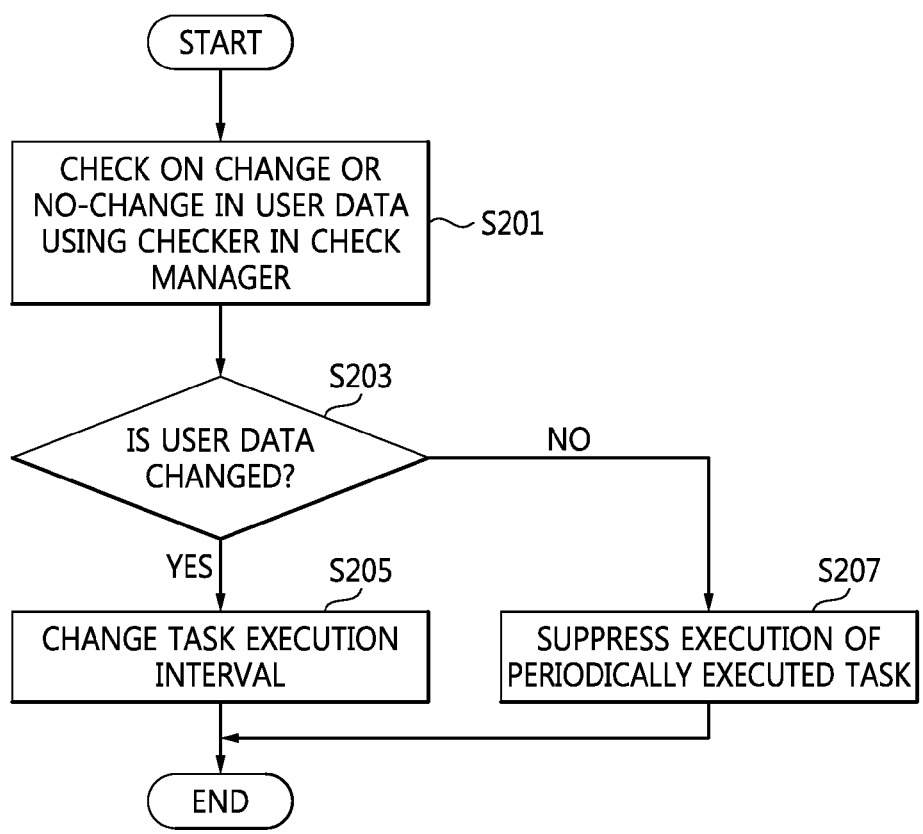
FIG. 9 is a flowchart of the operation of the task execution interval controller illustrated in FIG. 4.

FIG. 9 is a flowchart of the operation of the task execution interval controller 260 illustrated in FIG. 4. Referring to FIGS. 1, 4, and 9, the check manager 200 or 200-3 executed by the CPU 110 in the controller 100 may check on a change or no-change in user data in operation S201. The user data checker 210 included the check manager 200 or 200-3 may determine a change or no-change in the user data and generate the indication signal CS according to the determination result in operation S203.

When the indication signal CS indicates that the user data is changed, the task execution interval controller 260 may change an execution interval of a task, which was periodically executed by the CPU 110, such that the changed execution interval is from a time point when the user data is changed to a time point when the task is completed in operation S205. When the indication signal CS indicates that the user data is not changed, the task execution interval controller 260 may suppress the execution of the task, which was periodically executed by the CPU 110, in operation S207. In detail, the task execution interval controller 260 may control the task, which was periodically executed by the CPU 110, not to be executed in operation S207.

Figure 10:
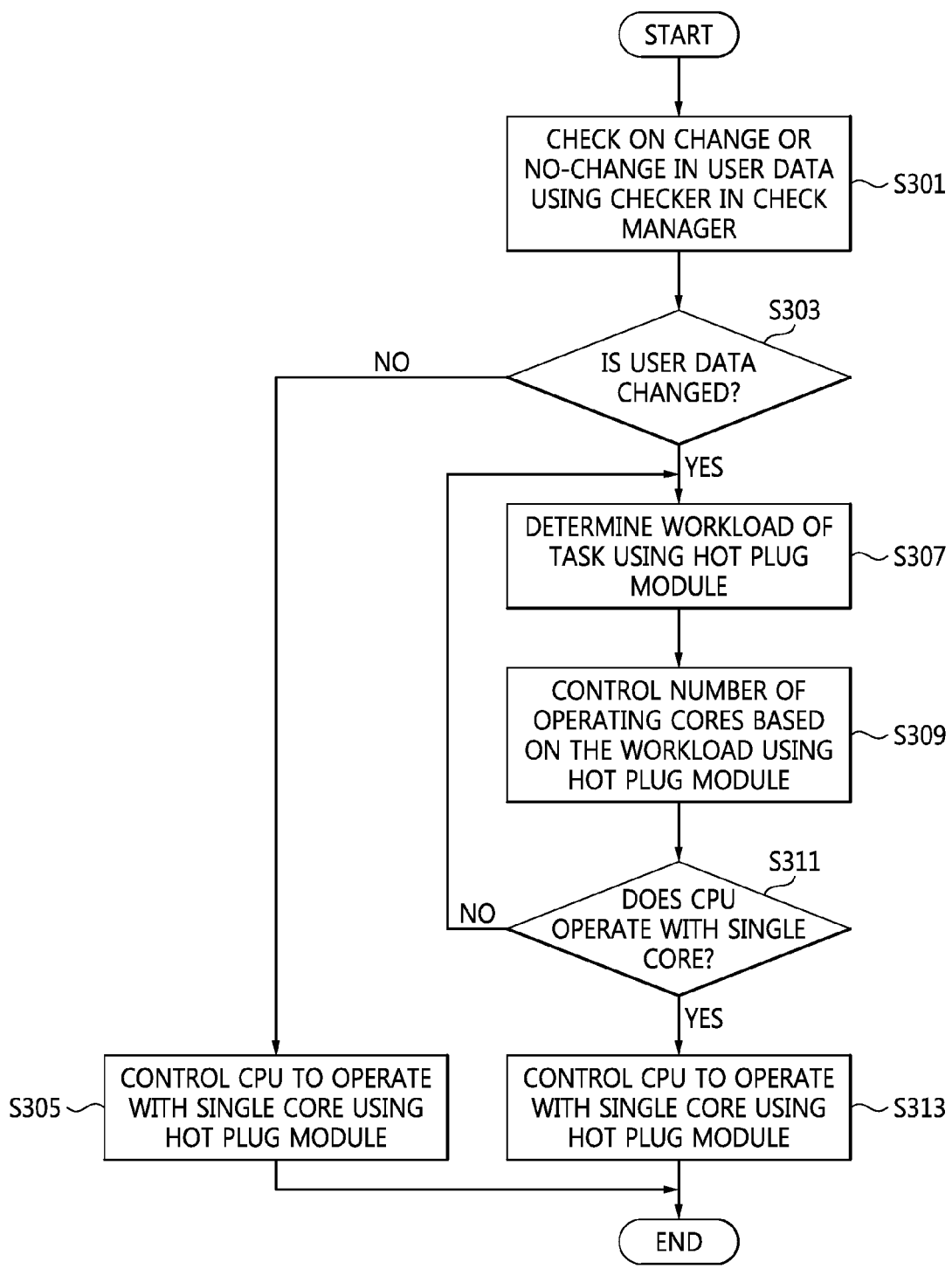
FIG. 10 is a flowchart of the operation of the hot plug module illustrated in FIG. 6.

FIG. 10 is a flowchart of the operation of the hot plug module 270 illustrated in FIG. 6. Referring to FIGS. 1, 6, and 10, the check manager 200 or 200-4 executed by the CPU 110 or 110-2 in the controller 100 may check on a change or no-change in user data in operation S301. The user data checker 210 included the check manager 200 or 200-4 may determine a change or no-change in the user data and generate the indication signal CS according to the determination result in operation S303.

When the indication signal CS indicates that the user data is not changed, the hot plug module 270 may control only one of the first and second processors 111 and 112 included in the CPU 110-2 to operate in operation S305. In other words, the hot plug module 270 may control the CPU 110-2 to operate only one processor.

When the indication signal CS indicates that the user data is changed, the hot plug module 270 may determine a workload of the task corresponding to the user data in operation S307. The hot plug module 270 may determine whether to operate the first and second processors 111 and 112 included in the CPU 110-2 based on the determined workload in operation S309. In other words, the hot plug module 270 may control the number of processors which operate in the CPU 110-2 in operation S309.

The hot plug module 270 may determine whether the CPU 110 operates only one of the processors 111 and 112 in operation S311. When one of the processors operates in the CPU 110, the hot plug module 270 may control the one processor until another change occurs in the user data in operation S313. When the CPU 110 does not operate with only one of the processors 111 and 112, the hot plug module 270 may determine the workload until only one processor operates in the CPU 110.

Figure 11:
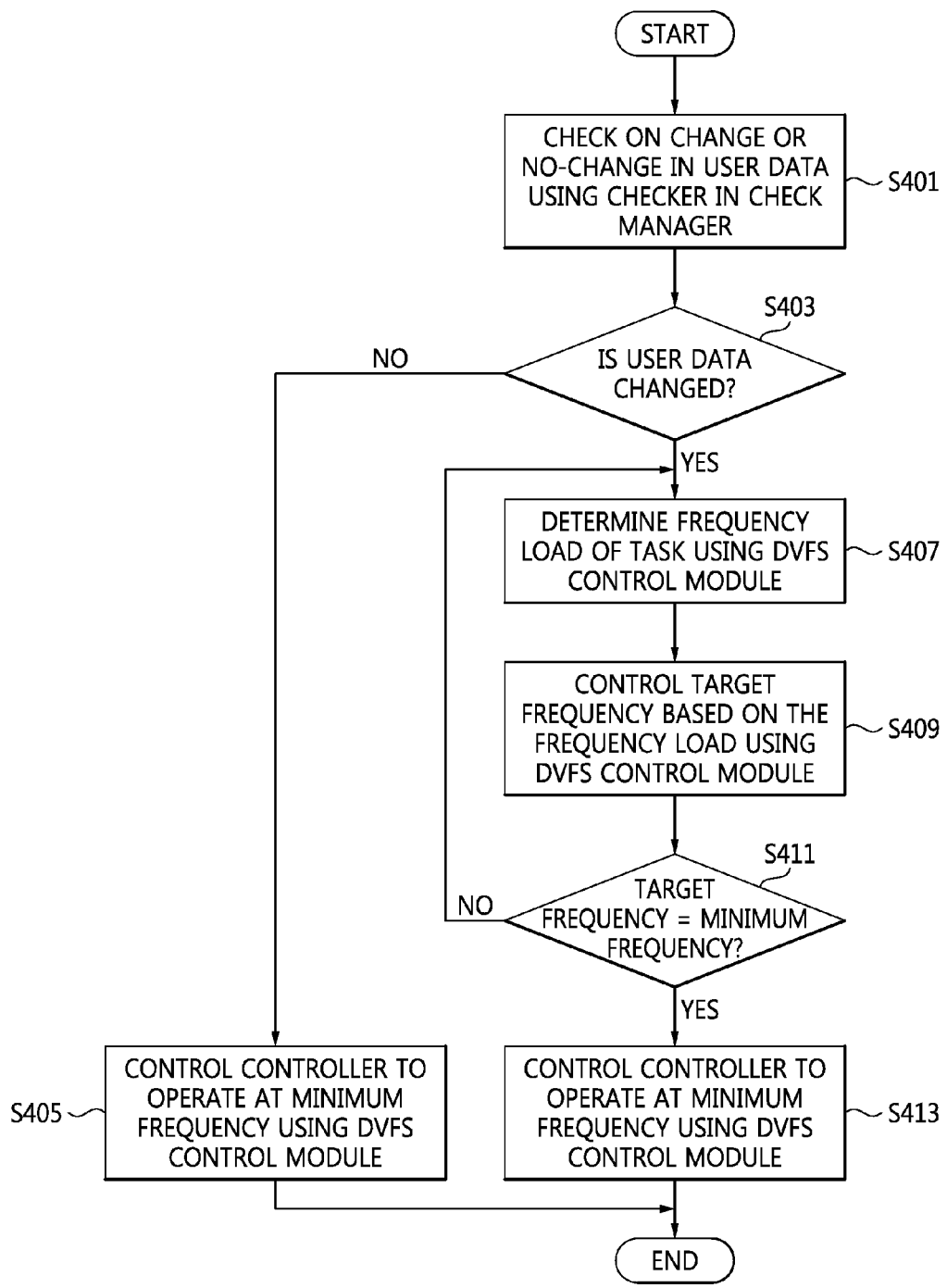
FIG. 11 is a flowchart of a method of operating the DVFS control module illustrated in FIGS. 7.

FIG. 11 is a flowchart of a method of operating the DVFS control module 280 illustrated in FIG. 7. Referring to FIGS. 1, 7, and 10, the check manager 200 or 200-5 executed by the CPU 110 in the controller 100 may check on a change or no-change in user data in operation S401. The user data checker 210 included the check manager 200 or 200-5 may determine a change or no-change in the user data and generate the indication signal CS according to the determination result in operation S403.

When the indication signal CS indicates that the user data is not changed, the DVFS control module 280 may change a frequency provided for the controller 100 into a predetermined minimum frequency in operation S405. In detail, the DVFS control module 280 may control the CMU 140 to apply a clock signal having the minimum frequency to the controller 100.

When the indication signal CS indicates that the user data is changed, the DVFS control module 280 may determine a frequency load of a task corresponding to the user data in operation S407. The DVFS control module 280 may determine a target frequency of the clock signal applied to the controller 100 based on the determined frequency load in operation S409.

The DVFS control module 280 may compare the target frequency provided for the controller 100 with the minimum frequency in operation S411. When the target frequency is the same as the minimum frequency, the DVFS control module 280 may control the CMU 140 to apply the clock signal having the target frequency to the controller 100 until another change occurs in the user data in operation S413. When the target frequency is not the same as the minimum frequency, the DVFS control module 280 may determine the frequency load until the target frequency is the same as the minimum frequency.

FIG. 12 is a schematic block diagram of an electronic system 500 including the controller 100 according to an exemplary embodiment. Referring to FIGS. 1 through 12, the electronic system 500 may be implemented as the computing apparatus 10 illustrated in FIG. 1. The electronic system 500 may include the controller 100, a power source 510, a storage 520, a memory 530, I/O ports 540, an expansion card 550, a network device 560, and a display 570. The electronic system 500 may also include a camera module 580.

The controller 100 may be the same or similar to the controller 100 illustrated in FIG. 1. The controller 100 may control the operation of each of the elements 510 through 580. The power source 510 may supply an operating voltage to at least one of the elements 100 and 520 through 580. The storage 520 may be implemented as a hard disk drive (HDD) or an SSD.

The memory 530 may be implemented as a volatile or non-volatile memory. A memory controller (not shown) that controls a data access operation, e.g., a read operation, a write operation (or a program operation), or an erase operation, on the memory 530 may be integrated into or embedded in the controller 100. Alternatively, the memory controller may be provided between the controller 100 and the memory 530.

The I/O ports 540 may receive data transmitted to the electronic system 500 or transmit data from the electronic system 500 to an external device. For instance, the I/O ports 540 may include a port for connection with a pointing device such as a computer mouse, a port for connection with a printer, and a port for connection with a universal serial bus (USB) drive.

The expansion card 550 may be implemented as a secure digital (SD) card or an MMC. The expansion card 550 may be a subscriber identity module (SIM) card or a universal SIM (USIM) card.

The network device 560 enables the electronic system 500 to be connected with a wired or wireless network. The display 570 displays data output from the storage 520, the memory 530, the I/O ports 540, the expansion card 550, or the network device 560.

The camera module 580 is a module that can convert an optical image into an electrical image. Accordingly, the electrical image output from the camera module 580 may be stored in the storage 520, the memory 530, or the expansion card 550. In addition, the electrical image output from the camera module 580 may be displayed through the display 570.

As described above, according to some embodiments of the inventive concept, an application processor performs power management based on whether user data, that is directly or indirectly provided for a user, is changed. Since the application processor can dynamically control power based on a change or no-change in the user data, the power consumption of the application processor is decreased.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include a read-only memory (ROM), a random-access memory (RAM), a compact disc (CD)-ROM, a digital versatile disc (DVD), a magnetic tape, a floppy disk, and an optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements or units represented by a block as illustrated in FIGS. 1-4, 6, 7, and 12 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. An application processor comprising:
a central processing unit (CPU) configured to generate a control signal in response to determining whether user data is changed, the user data corresponding to data of a user interface (UI), and the user data being determined as changed based on an update to the UI,
wherein the CPU comprises a first processor and a second processor, the first processor and the second processor are heterogeneous multiprocessors,
wherein the application processor is configured to implement a power manager which dynamically controls power provided to the first processor and the second processor, in response to the control signal,
wherein the first processor implements a task whose workload is less than a reference value and, the second processor implements a task whose workload is greater than the reference value,
wherein the CPU is configured to generate the control signal by implementing a check manager, and
wherein the check manager comprises:
a checker which generates an indication signal indicating whether the user data is changed;
a scheduler which generates a reference value control signal in response to the indication signal, the reference value control signal controlling the reference value; and
a migrator which migrates the task from the first processor to the second processor in response to the reference value controlled by the reference value control signal.

2. The application processor of claim 1, wherein the scheduler generates the reference value control signal such that the reference value is maintained or decreased, in response to the indication signal indicating that the user data is changed, and
wherein the scheduler generates the reference value control signal such that the reference value is increased, in response to the indication signal indicating that the user data is not changed.

3. The application processor of claim 1,
wherein the check manager further comprises:
a task execution interval controller which controls an execution interval of a given task, the given task corresponding to the user data, in response to the indication signal.

4. The application processor of claim 1,
wherein the check manager further comprises:
a hot plug processor which determines whether to operate at least one of the first processor and the second processor based on the indication signal.

5. The application processor of claim 1, further configured to implement a clock manager which dynamically controls a clock signal applied to the first processor in response to the control signal,
wherein the check manager further comprises:
a dynamic voltage and frequency scaling (DVFS) controller which controls a DVFS of the first processor based on the indication signal.

6. The application processor of claim 1, wherein the user data comprises at least one of image data and non-image data.

7. A system on chip, comprising:
a memory configured to store a check manager; and
a central processing unit (CPU) configured to implement the check manager,
wherein the CPU comprises a first processor and a second processor, the first processor and the second processor are heterogeneous multiprocessors,
wherein, when the check manager is implemented by the CPU, the check manager causes the CPU to generate a control signal in response to determining whether user data is changed, the user data corresponding to data of a user interface (UI), and the user data being determined as changed based on an update to the UI,
wherein the system on chip is configured to implement a power manager which dynamically controls power provided to the first processor and the second processor, in response to the control signal,
wherein the first processor implements a task whose workload is less than a reference value and, the second processor implements a task whose workload is greater than the reference value,
wherein the CPU is configured to generate the control signal by implementing the check manager, and
wherein the check manager comprises:
a checker which generates an indication signal indicating whether the user data is changed;
a scheduler which generates a reference value control signal in response to the indication signal, the reference value control signal controlling the reference value; and
a migrator which migrates the task from the first processor to the second processor in response to the reference value controlled by the reference value control signal.

8. The system on chip of claim 7, wherein the scheduler generates the reference value control signal such that the reference value is maintained or decreased, in response to the indication signal indicating that the user data is changed; and
the scheduler generates the reference value control signal such that the reference value is increased, in response to the indication signal indicating that the user data is not changed.

9. The system on chip of claim 7, wherein the check manager further comprises:
a task execution interval controller which controls an execution interval of a given task, the given task corresponding to the user data, in response to the indication signal.

10. The system on chip of claim 7,
wherein the check manager further comprises:
a hot plug processor which determines whether to operate at least one of the first processor and the second processor based on the indication signal.

11. A computing apparatus comprising:
at least one memory operable to store program code; and
at least one processor operable to read the program code and operate as instructed by the program code, wherein the program code causes the at least one processor to detect whether user data is changed, the user data corresponding to data of a user interface (UI), and the user data being determined as changed based on an update to the UI, and causes the at least one processor to dynamically control power that is provided to the at least one processor, in response to a result of detecting whether the user data is changed,
wherein the at least one processor comprises a first processor that consumes lower power and a second processor that consumes higher power, wherein the computing apparatus is configured to generate a control signal by implementing a check manager, and wherein the check manager comprises:
- a checker which generates an indication signal indicating whether the user data is changed;
- a scheduler which generates a reference value control signal in response to the indication signal, the reference value control signal controlling a reference value; and
- a migrator which migrates a task from the first processor to the second processor in response to the reference value controlled by the reference value control signal.

12. The computing apparatus of claim 11, wherein the program code causes the at least one processor to dynamically control the power by controlling such that a given task corresponding to the user data, the given task previously executed at a predetermined period, is executed in response to detecting that the user data is changed and is not executed in response to detecting that the user data is not changed.

13. The computing apparatus of claim 11,
wherein the program code causes the at least one processor to dynamically control the power by controlling such that at least one of the first processor and the second processor is operated based on a workload of a given task, the given task corresponding to the user data, in response to detecting that the user data is changed.

14. The computing apparatus of claim 11, wherein the program code causes the at least one processor to dynamically control the power by controlling a frequency of a clock signal applied to the at least one processor based on a frequency load of a given task, the given task corresponding to the user data, in response to detecting that the user data is changed.

* * * * *